No. 822,512. PATENTED JUNE 5, 1906.
R. C. DE LA HUNT.
FLUSH TANK SIPHON.
APPLICATION FILED SEPT. 19, 1904.
3 SHEETS—SHEET 2.
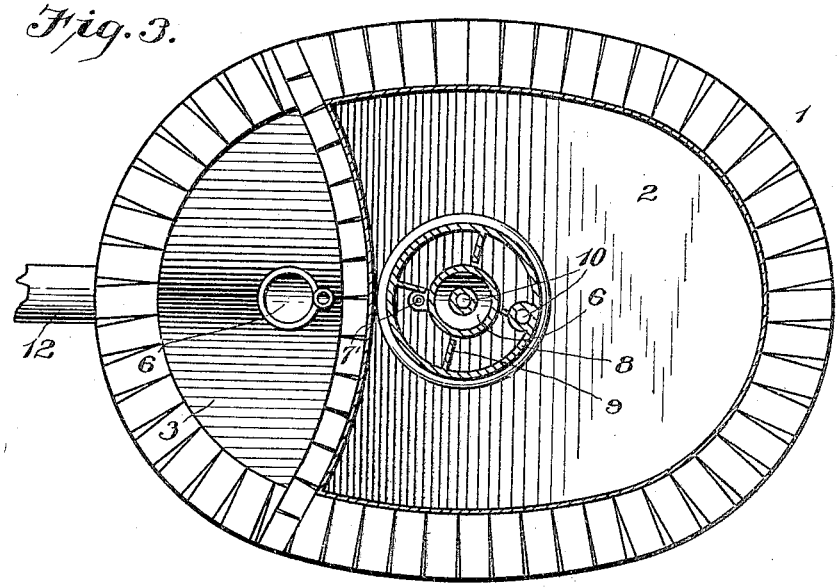
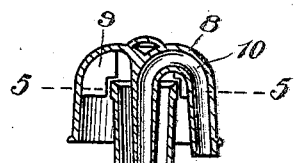
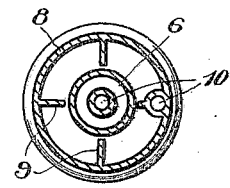
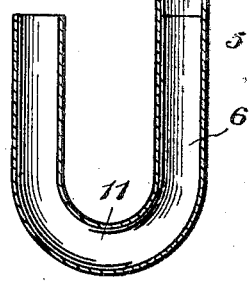
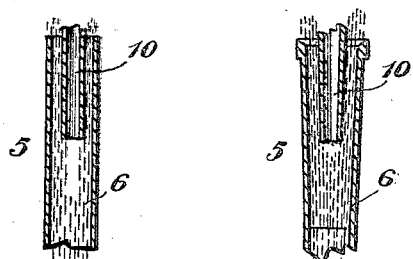
Witnesses
T. P. Brett
E. C. Duffy
Inventor
R. C. De La Hunt,
By C. E. Duffy
Attorneys No. 822,512. PATENTED JUNE 5, 1906.
R. C. DE LA HUNT.
FLUSH TANK SIPHON.
APPLICATION FILED SEPT. 19, 1904.
3 SHEETS—SHEET 3.
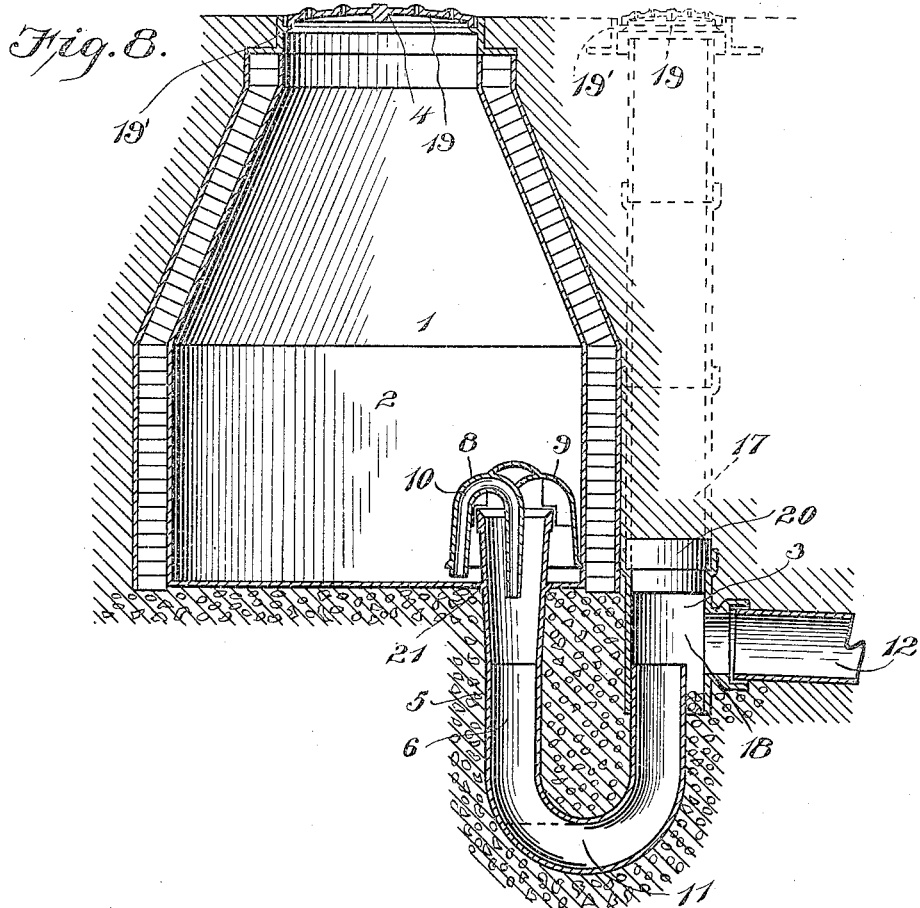
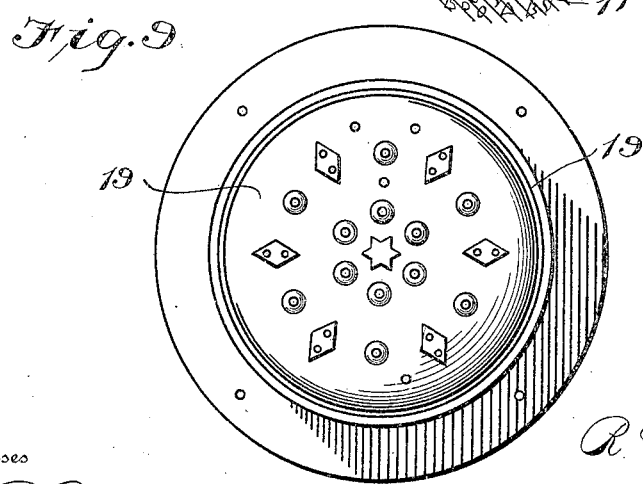
Witnesses
J. P. Britt
E. C. Duffy
Inventor
R. C. De La Hunt,
By C. E. Duffy & Son
Attorneys

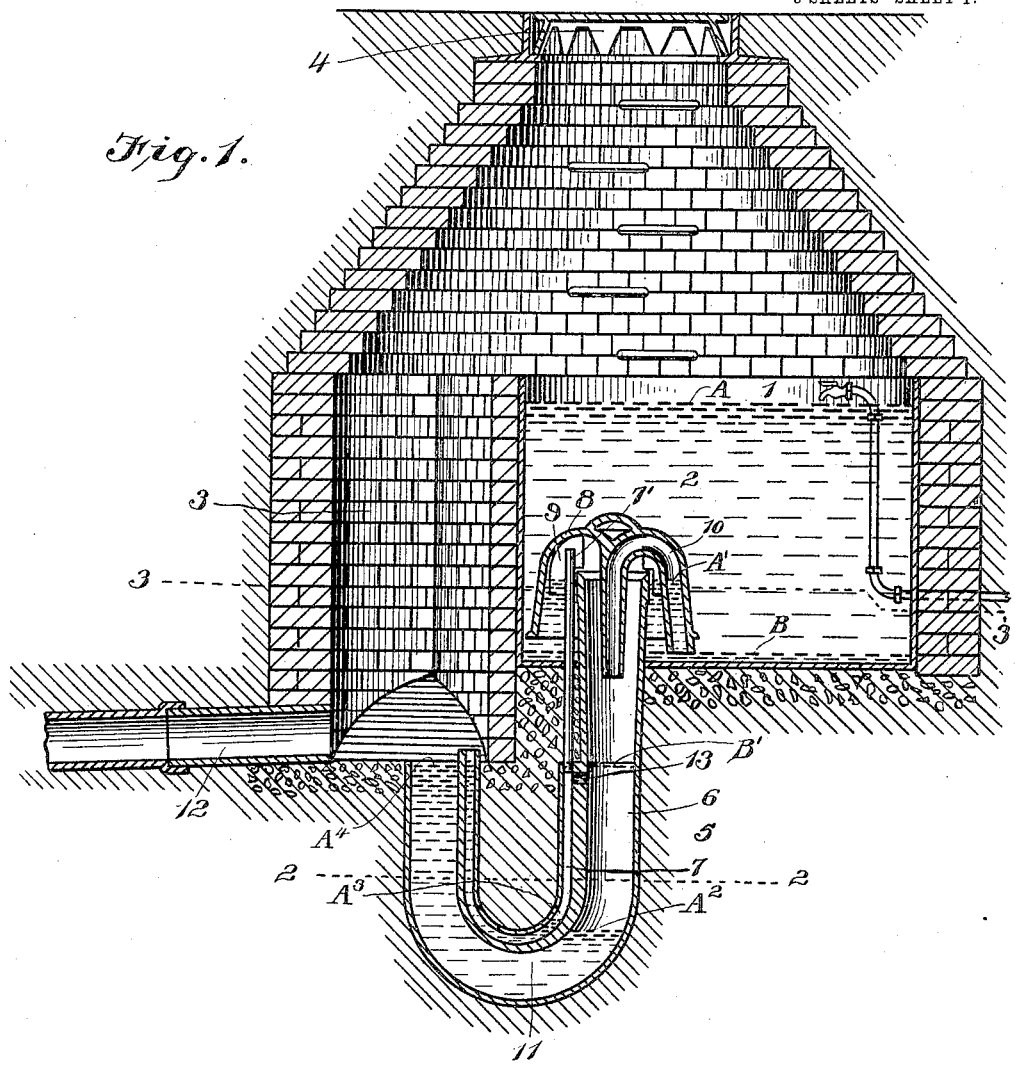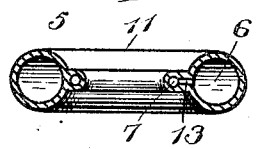

UNITED STATES PATENT OFFICE.

REVERDY CLEMENT DE LA HUNT, OF CEDAR RAPIDS, IOWA.

FLUSH-TANK SIPHON.

No. 822,512.  Specification of Letters Patent.  Patented June 5, 1906.

Application filed September 19, 1904. Serial No. 225,054.

*To all whom it may concern:*

Be it known that I, REVERDY CLEMENT DE LA HUNT, a citizen of the United States, residing at Cedar Rapids, in the county of Linn and State of Iowa, have invented certain new and useful Improvements in Flush-Tank Siphons; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to flush-tank siphons, and has for its object to provide a device of this class which will operate automatically and which will not fail after discharging a few times.

A further object of my invention is to provide a flush-tank siphon which is simple in its construction, cheap and easy to manufacture, and composed of a minimum number of parts.

A further object of my invention is to reduce the cost of the flush-tank without materially affecting its efficiency.

A further object of my invention is to provide a flush-tank siphon which does not require back-venting or venting at its discharge end, for the reason that I provide an after-fill or small siphon which properly restores the seal of the trap after the discharge of flush-tank ceases.

Heretofore siphons for flush-sewers were invariably vented at both inlet and outlet. I, however, have dispensed altogether with venting devices, the after-fill or small siphon being made integral with the dome of the main siphon. This after-fill acts during and after the siphonage ceases in the main siphon, lowering the water in the tank below the mouth of the dome, thus fully recharging the dome with air and the trap with water after each discharge, thereby maintaining the condition necessary to insure automatic siphonage.

It is a difficult matter to properly vent the outlet of the automatic siphon, and it is especially difficult when used for discharging septic tanks.

With these objects in view my invention consists in the novel construction of my siphon and also in certain combinations of parts, which will be first fully described, and afterward specifically pointed out in the appended claims.

From observations it can be stated that three-fourths of the siphons which are designed to flush sewers automatically fail to work after discharging a few times, and almost invariably the stream runs through the apparatus, and as there is usually no means of inspecting the outlet end of the siphon it is supposed that it is working properly, while as a matter of fact the siphonic action has long been broken and was not automatically restored. Numerous defects in the construction of siphons are responsible for their failure, and it is for the purpose of providing a positively automatic siphon which will not fail to operate that I have made this present invention.

Referring to the accompanying drawings, Figure 1 is a sectional view showing siphon in position in flush-tank. Fig. 2 is a horizontal sectional view taken on line 2 2 of Fig. 1. Fig. 3 is a horizontal sectional view taken on line 3 3 of Fig. 1. Fig. 4 is a sectional view showing main siphon constructed without auxiliary siphon. Fig. 5 is a horizontal section on line 5 5 of Fig. 4. Fig. 6 is a fragmentary view showing the usual construction of intake end of main siphon and discharge end of vent. Fig. 7 is a fragmentary view of intake end of main siphon and discharge end of vent as employed in my device. Fig. 8 is a vertical sectional view illustrating the siphon shown in Fig. 4, its long leg terminating in the tank and the short leg terminating in a vertical pipe; and Fig. 9 is a plan view of the manhole and tank-cover made in two pieces.

Like characters of reference indicate the same parts throughout the several figures, in which—

1 indicates the flush-tank, 2 indicates the chamber from which the water is to be discharged, and 3 the chamber which receives the water from the flush-tank.

4 indicates a cap at the surface, providing for admission of air to the flush-tank.

5 indicates the siphon, which, as shown in Fig. 1, is composed of the main siphon 6, auxiliary siphon 7, and bell-shaped intaking-limb 8, said siphon having its inlet projecting into the receiving-chamber and its outlet entering the discharging-chamber. The said bell-shaped intaking-limb 8 is provided with webbed wings 9 for supporting it firmly in place upon the inlet end of the siphon, and said intaking-limb is also provided with a siphonic venting device or small siphon 10 for breaking the siphonage and at the same time restoring the water-levels therein to the same normal condition that existed previous to the siphonage, the said siphon having a seal-trap 11 and the discharge-chamber 3, providing for inspection of the siphon-outlet, said outlet connected to the sewer 12.

It will be noted by referring to Fig. 1 that a portion of the auxiliary siphon 7 is cast integral with the main siphon 6, the remaining portion being a straight pipe 7', threaded into the casting and extending up into the bell-shaped intaking-limb 8 to a point above the end of the main siphon 6. It will also be noted from Figs. 1 and 7 that the upper or intaking end of the main siphon is slightly flared, while the discharge end of the small siphon 10 is tapered.

Referring also to Fig. 1, it will be seen that there is a small waterway 13, connecting the main and auxiliary siphons, which is for the purpose of bringing the water in the two traps of the siphons to one level when siphonic action ceases, for as the discharge end of the auxiliary trap must project above the end of the main trap it is readily seen that by reason of this construction I can place the bends of the two traps close together and make them integral, whereas without the waterway connection the auxiliary trap would have to be raised farther above the main trap and separate therefrom.

Referring to Fig. 8, it will be seen that the short leg of the siphon 5 terminates in a vertical pipe 17, (shown in dotted lines,) which is connected to the sewer 12 by means of the T 18. This construction is preferable, as it reduces the cost of the device, the pipe 17 allowing inspection of the discharge end of the siphon, and acts as a vent for the escape of sewer-gas which accumulates at the higher points in the sewer. A lid or cover 18 and a ring 19 serve to cap the said pipe 17, or this pipe may be dispensed with and a wooden plug 20 located at the upper end of the T 18.

It will be noted by referring to Fig. 8 that the siphons are provided with a bead 21, which indicates the floor-line of the tank and the proper position of the siphon.

Having thus described the several parts of my invention, its operation is as follows:

In Fig. 1, A, A', A², A³, and A⁴ represent the levels of water in the siphons and reservoir about the time siphonage will take place. The operation of the siphon is the same as that of the blow-off or auxiliary siphon in the double-tube type—that is, when the water is depressed in the main trap to the level A² the air escaping through the outlet-limb discharges a portion of the water and so weakens the seal that the water and air inclosed by it are discharged by the inflow of water from the reservoir above it.

B and B' represent the levels of water in siphons and flush-tank when siphonage ceases and equilibrium is restored, and in order to restore this level and maintain a full and perfect seal in the siphon-trap the small siphon 10 is provided, which is in siphonic action for a considerable time after siphonage ceases in the main siphon, thus allowing time for the rarefied air to become normal by the reinforcement of air that enters the flush-tank through its cap or cover 4. The other function of the small siphon is to draw the water out of the tank and discharge it into the main siphon, thus insuring a full and perfect seal in the trap and by the same process opening the siphon-inlet by drawing the water lower than said inlet, thus securing a full charge of air to the siphon.

Referring to Figs. 6 and 7 in this connection, it will be seen from Fig. 7 that as siphonage commences in the main siphon the flared shape thereof forces the water inwardly and the air in the siphon-vent 10 is carried downwardly and out through the siphon by the inrushing water, thereby also bringing the vent or small siphon into siphonic action, which action continues after siphonage of the main siphon in order to resupply the air in the main siphon and to reestablish the proper water-level therein, as before described.

The single-trap siphon (shown in Fig. 4) is only operative with a deep-seal trap—that is, a trap having a seal of twenty-six inches or more—while the double-trap siphon (shown in Fig. 1) may be made to operate with a very shallow trap-seal, and is therefore applicable to use in any condition that may occur in practice, the only material difference in the operation of the two siphons being that the double-trap siphon discharges the confined air in the initial act of siphonage through the auxiliary siphon. Otherwise they are practically the same, inasmuch as the same forces bring them into action and the same venting apparatus makes them automatic.

Having thus described my invention, I do not wish to be understood as limiting myself to the exact construction as herein set forth, as various slight changes can be made therein which would fall within the limit and scope of my invention, and I consider myself clearly entitled to all such changes and modifications.

What I claim as my invention, and desire to secure by Letters Patent of the United States, is—

1. In a flush-tank siphon, the combination with a main siphon provided with a flaring intaking end, an auxiliary siphon associated therewith, an intaking-limb at the intaking ends of said siphons, said auxiliary siphon extending up into said intaking-limb for discharging the confined air in the initial act of siphonage, a small siphon associated with said intaking-limb and having its long leg within the said flared intaking end of said main siphon, said long leg of said small siphon being tapered and disposed centrally within the intaking end of said main siphon in such manner that the water rushing into the intaking end of said main siphon surrounds the long leg of said small siphon to bring said small siphon into siphonic action, substantially as described.

2. In a flush-tank siphon, the combination with a main siphon provided with a flaring intaking end, an intaking-limb at the intaking end of said main siphon, a small siphon associated with said intaking-limb having its short leg extending below the bottom edge of said intaking-limb and having its long leg tapered and disposed centrally with the said flared intaking end of said main siphon in such manner that the water rushing into said main siphon at the initial act of siphonage surrounds the said long leg of said small siphon to bring said small siphon into siphonic action, substantially as described.

3. In a flush-tank siphon, the combination with a main siphon provided with a flared intaking end, an intaking-limb at the intaking end of said main siphon, a small siphon associated with said intaking-limb and having its short leg extending below the bottom edge of said intaking-limb and its long leg disposed centrally within the intaking end of said main siphon in such manner that the water rushing into said main siphon surrounds said long leg of said small siphon to bring said small siphon into siphonic action, substantially as described.

4. In a flush-tank siphon, the combination with a main siphon, of an intaking-limb at the intaking end of said main siphon, a small siphon associated with said intaking-limb and having its short leg extending below the bottom edge of said intaking-limb and its long leg disposed centrally within the intaking end of said main siphon in such manner that the water rushing into said main siphon surrounds the long leg of said small siphon to bring said small siphon into siphonic action, substantially as described.

5. In a flush-tank siphon, the combination with a main siphon, having intaking end flared, of an intaking-limb at the intaking end of said main siphon, a small siphon associated with said intaking-limb and having its short leg extending below the bottom edge of said intaking-limb and its long leg disposed within the flared end of said main siphon, substantially as described.

In testimony whereof I have affixed my signature in presence of two witnesses.

REVERDY CLEMENT DE LA HUNT.

Witnesses:
PETER CULLEN,
JOHN D. STEWART.